US010904540B2

(12) United States Patent
Yang

(10) Patent No.: US 10,904,540 B2
(45) Date of Patent: Jan. 26, 2021

(54) VIDEO DECODER RATE MODEL AND VERIFICATION CIRCUIT

(71) Applicant: Avago Technologies International Sales Pte. Limited, Singapore (SG)

(72) Inventor: Zhijie Yang, Irvine, CA (US)

(73) Assignee: Avago Technologies International Sales Pte. Limited, Singapore (SG)

(*) Notice: Subject to any disclaimer, the term of this patent is extended or adjusted under 35 U.S.C. 154(b) by 0 days.

(21) Appl. No.: 16/173,455

(22) Filed: Oct. 29, 2018

(65) Prior Publication Data
US 2019/0174139 A1 Jun. 6, 2019

Related U.S. Application Data

(60) Provisional application No. 62/595,429, filed on Dec. 6, 2017.

(51) Int. Cl.
| | |
|---|---|
| *H04N 19/196* | (2014.01) |
| *H04N 19/192* | (2014.01) |
| *H04N 19/149* | (2014.01) |
| *H04N 19/172* | (2014.01) |
| *H04N 19/115* | (2014.01) |
| *H04N 19/164* | (2014.01) |
| *H04N 19/156* | (2014.01) |
| *H04N 19/132* | (2014.01) |

(52) U.S. Cl.
CPC ......... *H04N 19/198* (2014.11); *H04N 19/115* (2014.11); *H04N 19/132* (2014.11); *H04N 19/149* (2014.11); *H04N 19/156* (2014.11); *H04N 19/164* (2014.11); *H04N 19/172* (2014.11); *H04N 19/192* (2014.11)

(58) Field of Classification Search
None
See application file for complete search history.

(56) References Cited

U.S. PATENT DOCUMENTS

| | | | | |
|---|---|---|---|---|
| 5,499,325 A | * | 3/1996 | Dugan, Jr. | G09G 1/07 345/589 |
| 2004/0213345 A1 | * | 10/2004 | Holcomb | H04N 19/527 375/240.03 |
| 2005/0089092 A1 | * | 4/2005 | Hashimoto | H04N 19/172 375/240.03 |

(Continued)

*Primary Examiner* — Edemio Navas, Jr.
(74) *Attorney, Agent, or Firm* — Morgan, Lewis & Bockius LLP

(57) ABSTRACT

The present disclosure describes a video communication environment for encoding and/or decoding video frames in accordance with various video coding formats utilizing various coding parameters. The video communication environment can include one or more encoding verification circuit and/or decoding verification circuit throughout which utilizes the various coding parameters to model dynamics of decoding various encoded video frames and/or display timing for displaying various decoded video frames. This modeling of the dynamics of decoding and/or display timing can be used to verify whether these various encoded video frames, once decoded, can be displayed smoothly, for example, without jitter. In some situations, the modeling of the dynamics of decoding and/or display timing can be used to guide decoding and/or display process to display the various decoded video frames smoothly.

20 Claims, 6 Drawing Sheets

(56) References Cited

U.S. PATENT DOCUMENTS

| | | | |
|---|---|---|---|
| 2008/0159384 A1* | 7/2008 | Civanlar | H04L 12/66 375/240.01 |
| 2012/0072948 A1* | 3/2012 | Yang | H04L 47/15 725/32 |
| 2013/0229574 A1* | 9/2013 | MacInnis | H04N 21/4122 348/497 |
| 2014/0269401 A1* | 9/2014 | Gondi | H04L 43/0876 370/253 |

* cited by examiner

VIDEO DECODER RATE MODEL AND VERIFICATION CIRCUIT

CROSS-REFERENCE TO RELATED APPLICATIONS

The present application claims the benefit of U.S. Provisional Patent Appl. No. 62/595,429, filed Dec. 6, 2017, which is incorporated herein by reference in its entirety.

BACKGROUND

Display devices, such as electronic visual displays can include television sets, computer monitors, and/or digital signage to provide some examples, are being manufactured to display more pixels than ever before which results in capabilities to display higher quality video. The display resolution, also referred to as display modes, of these display devices represents the number of distinct pixels in each dimension that can be displayed. With the ever increasing demand for higher quality video, display resolutions are transitioning from Full High Definition, also referred to as 1080 p, to 4K resolution, also referred to as 4K. By 2020, more than half of U.S. households are expected to have 4K-capable TVs with advancement to the next generation 8 k in the future. The 1080 p display resolution typically consists of 2.1 megapixels per video frame whereas the 4K display resolution can include upwards of 8 megapixels per video frame. Because of the large amount pixels per video frame, these video frames are often encoded using various coding formats and thereafter decoded using these various coding formats allowing for their display. No longer can these video frames be decoded and displayed at the same rate. Rather, the encoded video frames can include hidden frames and/or show existing frames. These hidden frames are decoded but not displayed thereby increasing a decode rate, also referred to as a decode frame rate, at which these encoded video frames are decoded. These show existing frames are not decoded but displayed thereby increasing a display rate, also referred to as a display frame rate, at which these encoded video frames are displayed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
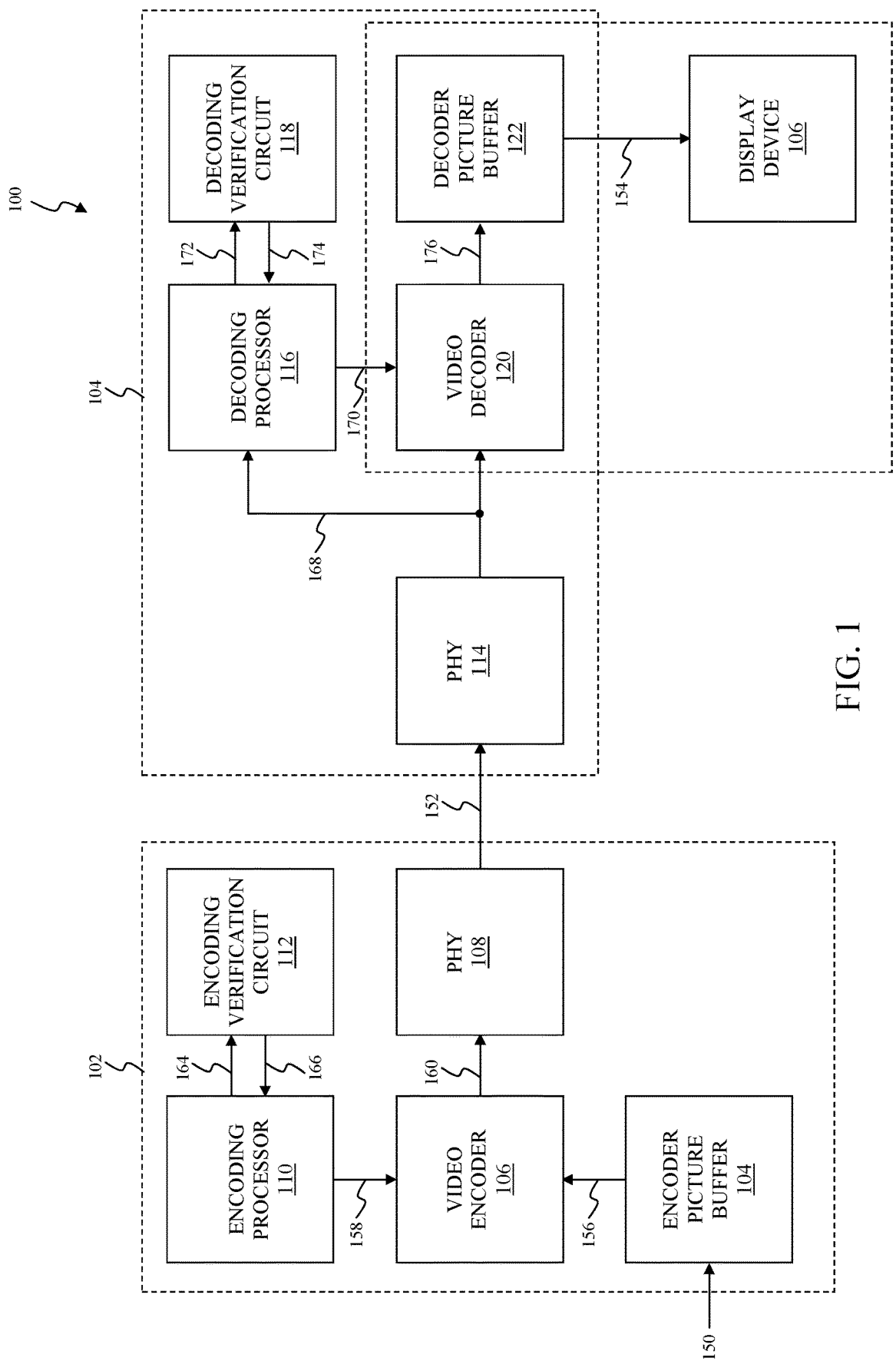
FIG. 1 illustrates a block diagram of an exemplary video communication environment according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

Overview

The present disclosure describes a video communication environment for encoding and/or decoding video frames in accordance with various video coding formats utilizing various coding parameters. The video communication environment can include one or more encoding verification circuit and/or decoding verification circuit throughout which utilizes the various coding parameters to model dynamics of decoding various encoded video frames and/or display timing for displaying various decoded video frames. This modeling of the dynamics of decoding and/or display timing can be used to verify whether these various encoded video frames, once decoded, can be displayed smoothly, for example, without jitter. In some situations, the modeling of the dynamics of decoding and/or display timing can be used to guide decoding and/or display process to display the various decoded video frames smoothly.

Exemplary Video Communication Environment

FIG. 1 illustrates a block diagram of an exemplary video communication environment according to an exemplary embodiment of the present disclosure. A video communication environment 100 utilizes various coding parameters to model dynamics of decoding and/or display timing. This modeling of the dynamics of decoding and/or display timing can be used to verify whether one or more video frames can be displayed smoothly, for example, without jitter. In some situations, the modeling of the dynamics of decoding and/or display timing can be used to guide decoding and/or display process to display the one or more video frames smoothly. In the exemplary embodiment illustrated in FIG. 1, the video communication environment 100 includes a communication transmitter 102 to encode one or more video frames 150 to provide one or more transmission frames 152 for transmission over a communication channel to a communications receiver 104. The communications receiver 104 recovers and decodes the one or more transmission frames 152 to provide one or more recovered video frames 154 to a display device 106.

The communication transmitter 102 determines one or more coding parameters, such as the decode frame rate and/or the display frame rate to provide some examples, to be used to encode the one or more video frames 150. In the exemplary embodiment illustrated in FIG. 1, the decode frame rate represents a rate of the communications receiver 104 in decoding video frames and the display frame rate represents a rate of the display device 106 in displaying video frames. Conventionally, the decode frame rate is assumed to be equal to the display frame rate. However, more advanced video coding formats, such as an Advanced Video Coding (AVC) coding format, an $2^{nd}$ generation Audio Video Coding Standard (AVS2) coding format, a High Efficiency Video Coding (HEVC) coding formant, a version of the VP video coding format, for example VP9, and/or an AOMedia Video 1 (AV1) coding format to provide some examples, introduced reference frames, such as hidden frames and/or show existing fames into the coding process. In some situations, these hidden frames and/or show existing fames can cause the decode frame rate to be different than the display frame rate. In an exemplary embodiment, the decode frame rate, for example, sixty-six (66) frames per second (fps), is approximately ten (10) percent greater than the display frame rate, for example, sixty (60) fps. As to be discussed in further detail below, the communication transmitter 102 can model the decoding of the one or more video frames 150 using the one or more coding parameters to model dynamics of decoding and/or display timing to verify whether the one or more recovered video frames 154 can be displayed smoothly by the display device 106. In the exemplary embodiment illustrated in FIG. 1, the communication transmitter 102 includes an encoder picture buffer 104, a video encoder 106, a physical layer (PHY) device 108, an encoding processor 110, and an encoding verification circuit 112.

The encoder picture buffer 104 stores the one or more video frames 150 for retrieval by the video encoder 106. The encoder picture buffer 104 can be implemented as a volatile memory storage device, such as a random-access memory (RAM) storage device to provide an example, which requires power to maintain the electronic data. The RAM storage device can be implemented in a dynamic random-access memory (DRAM), a static random-access memory (SRAM), and/or a non-volatile random-access memory (NVRAM), often referred to as a flash memory, configuration to provide some examples. In the exemplary embodiment, the one or more video frames 150 represent a digital sequence of images or pictures, referred to as video, which can be sequentially displayed in rapid succession to form a moving picture. The video can represent a sporting contest, a musical concert, a speech, a movie, a television sitcom, a television reality show, and/or any other suitable event which will be apparent to those skilled in the relevant art(s) without departing from the spirit and scope of the present disclosure.

The video encoder 106 encodes one or more video frames 156 stored within the encoder picture buffer 104 in accordance with one or more video coding formats utilizing one or more coding parameters 158, to be discussed in further detail below, received from the encoding processor 110 to provide one or more encoded video frames 160. In an exemplary embodiment, the one or more coding parameters 158 may be inserted into one or more frame headers of the one or more encoded video frames 160 and/or one or more sequence headers corresponding to multiple encoded video frames from among the one or more encoded video frames 160. In this exemplary embodiment, the communications receiver 104 can recover the one or more coding parameters 158 from the one or more frame headers and/or the one or more sequence headers and use the recovered parameters to decode the one or more encoded video frames 160 as to be discussed in further detail below. The one or more video coding formats can include an Advanced Video Coding (AVC) coding format, an Audio Video Coding Standard (AVS2) coding format, a High Efficiency Video Coding (HEVC) coding formant, a version of the VP video coding format, for example VP9, an AOMedia Video 1 (AV1) coding format and/or any other suitable coding format that includes regular show frames, hidden frames, and/or show existing frames that will be apparent to those skilled in the relevant art(s) without departing from the spirit and scope of the present disclosure.

As to be described in further detail below, the one or more encoded video frames 160 can include one or more regular show frames, one or more hidden frames, and/or one or more show existing frames. In an exemplary embodiment, the number of the one or more regular show frames, the one or more hidden frames, and/or the one or more show existing frames included within the one or more encoded video frames 160 are dependent upon the video represented by the one or more video frames 150. In this exemplary embodiment, the number of the one or more regular show frames, the one or more hidden frames, and/or the one or more show existing frames included within the one or more encoded video frames 160 can vary for different types of video.

The physical layer (PHY) device 108 arranges and/or formats the one or more encoded video frames 160 for transmitting on a physical medium in accordance with one or more communication standards and/or protocols for transmission to the communications receiver 104. The one or more communication standards and/or protocols can include one or more wireline communication standards and/or protocols such as Ethernet as defined in a version of an Institute of Electrical and Electronics Engineers (I.E.E.E.) 802.3 communication protocol, a Power over Ethernet communication protocol, a Point-to-Point Protocol over Ethernet (PPPoE) communication protocol, HomePNA (HPNA) as defined in a version of one of the ITU-T Recommendation G.995 communication protocols, and HomePlug as defined in a version of an Institute of Electrical and Electronics Engineers (I.E.E.E.) 1901 communication protocol, and/or any other suitable wired communication standard or protocol that will be apparent to those skilled in the relevant art(s) without departing from the spirit and scope of the present disclosure. Alternatively, or in addition to, the one or more communication standards and/or protocols can include one or more wireless communication standards and/or protocols such as a version of the IEEE 802.11 communication standard and/or protocol, also known as Wi-Fi, a version of the I.E.E.E. 802.16 communication standard and/or protocol, a version of a Bluetooth communication standard and/or protocol, a version of a ZigBee communication standard and/or protocol, a version of a Z-Wave communication standard and/or protocol, and/or any other suitable well known wireless networking standard and/or protocol that will be apparent to those skilled in the relevant art(s) without departing from the spirit and scope of the present disclosure. The one or more wireless communication standards and/or protocols can also include an 1×RTT communication standard and/or protocol, an Evolution Data Only/Evolution Data Optimized (EVDO) communication standard and/or protocol, a Global System for Mobile (GSM) communication standard and/or protocol, a General Packet Radio Service (GPRS) communication standard and/or protocol, an Enhanced Data rate for GSM Evolution (EDGE) communication standard and/or protocol, a High Speed Packet Access (HSPA) communication standard and/or protocol, a Universal Mobile Telecommunications System (UMTS) communication standard and/or protocol, a code-division multiple access (CDMA) communication standard and/or protocol, a first generation (1G) mobile communication standard and/or protocol, a second generation (2G) mobile communication standard and/or protocol, a third generation (3G) mobile communication standard and/or protocol, a Long Term Evolution (LTE) communication standard and/or protocol, a fourth generation (4G) mobile communication standard and/or protocol, a fifth generation (5G) mobile communication standard and/or protocol to provide some examples, and/or any other suitable well known wireless communication standard and/or protocol that will be apparent to those skilled in the relevant art(s) without departing from the spirit and scope of the present disclosure.

The encoding processor 110 controls overall configuration and/or operation of the communication transmitter 102 with respect to coding of the one or more video frames 150. In the exemplary embodiment illustrated in FIG. 1, the encoding processor 110 determines the one or more coding parameters 158 to be used by the video encoder 106 to encode the one or more video frames 156. The one or more coding parameters 158 can include an initial display delay, an extra decoder picture buffer size, the decode frame rate, the display frame rate, and/or any other suitable parameter utilized by the one or more video coding formats implemented by the video encoder 106 to encode the one or more video frames 156 that will be apparent to those skilled in the relevant art(s) without departing from the spirit and scope of the present disclosure. The initial display delay represents an initial delay in time, usually milliseconds (ms), before the display device 106 commences to display the one or more recovered video frames 154. In some situations, as described above, the decode frame rate is greater than the display frame rate in some embodiments. In these situations, the initial display delay allows the communications receiver 104 to commence the decoding process of the one or more transmission frames 152 before the display device 106 commences to display the one or more recovered video frames 154. The extra decoder picture buffer size represents an increased size of a decoder picture buffer of the communications receiver 104 over a conventional decoder picture buffer, to be discussed in further detail below, required to accommodate this greater decode frame rate. In an exemplary embodiment, the extra decoder picture buffer size indicates the number of additional frames needed over a conventional decoder picture buffer for storing the one or more transmission frames 152 decoded by the communications receiver 104. As described above, the one or more coding parameters 158 are selectively chosen by the encoding processor 110 to allow the display device 106 to display the one or more recovered video frames 154 smoothly, for example, without jitter. In an exemplary embodiment, an initial display delay of sixty (60) ms and an extra decoder picture buffer size of one (1) is sufficient for a decode frame rate of sixty-six (66) fps and a display frame rate of sixty (60) fps to allow the display device 106 to display the one or more recovered video frames 154 smoothly.

The encoding verification circuit 112 verifies the video encoder 106 encodes the one or more video frames 156 in such a manner to allow the display device 106 to display the one or more recovered video frames 154 smoothly. In the exemplary embodiment illustrated in FIG. 1, the encoding processor 110 provides the one or more coding parameters 158 as one or more coding parameters 164 to the encoding verification circuit 112 for verification. In an exemplary embodiment, the encoding processor 110 provides the one or more coding parameters 158 to the encoding verification circuit 112 before the video encoder 106 commences to encode the one or more video frames 156. The encoding verification circuit 112 models decoding of the one or more encoded video frames 160 using the one or more video coding formats of the video encoder 106 and the one or more coding parameters 164 to verify these decoded video frames would be displayed by the display device 106 smoothly. In the exemplary embodiment illustrated in FIG. 1, the encoding verification circuit 112 models the dynamics of decoding and/or display timing to be discussed in further detail below. In this exemplary embodiment, this modeling detects whether an underflow condition would occur in this decoder picture buffer if the one or more encoded video frames 160 were to be decoded by the communications receiver 104 using the one or more video coding formats of the video encoder 106 and the one or more coding parameters 164. This underflow condition, when present, causes latency in the display device 106 which causes jitter in the one or more recovered video frames 154 being displayed by the display device 106. In some situations, the underflow condition occurs when the display device 106 is prepared to display the one or more recovered video frames 154, but the one or more recovered video frames 154 are not yet available to be released by the decoder picture buffer of the communications receiver 104. In these situations, the one or more coding parameters 158 need to be adjusted, for example, the initial display delay and/or the extra decoder picture buffer size, as described above, need to be increased, to accommodate the decoded video frames from the decoder picture buffer of the communications receiver 104. The encoding verification circuit 112, in response to this modeling, provides a modeling outcome 166 to the encoding processor 110 to indicate whether the one or more coding parameters 164 result in the one or more recovered video frames 154 being displayed by the display device 106 smoothly or with jitter. Thereafter, the encoding processor 110 and the encoding verification circuit 112 can functionally cooperate to iteratively adjust the one or more coding parameters 164 until the one or more recovered video frames 154 are modeled by the encoding verification circuit 112 as being displayed by the display device 106 smoothly. Otherwise, the encoding processor 110 can provide the one or more coding parameters 164 which resulted in the one or more recovered video frames 154 being displayed by the display device 106 smoothly to the video encoder 106 as the one or more coding parameters 158.

The communication receiver 104 recovers the one or more coding parameters utilized by the communication transmitter 102 to encode the one or more video frames 150. Thereafter, the communication receiver 104 decodes the one or more transmission frames 152 in accordance with the one or more video coding formats utilizing the one or more recovered coding parameters to provide the one or more recovered video frames 154 to the display device 106. As to be discussed in further detail below, the communication receiver 104 can model the decoding of the one or more transmission frames 152 utilizing the one or more recovered coding parameters to model dynamics of decoding and/or display timing to verify whether the one or more recovered video frames 154 can be displayed smoothly by the display device 106 in a substantially similar manner as the communication transmitter 102. In the exemplary embodiment illustrated in FIG. 1, the communication receiver 104 includes a physical layer (PHY) device 114, a decoding processor 116, a decoding verification circuit 118, a video decoder 120, and a decoder picture buffer 122. In some situations, the communication receiver 104 need not include the video decoder 120. In these situations, the communication receiver 104 verifies the one or more recovered video frames 168 can be decoded, without actually decoding, in such a manner to allow the display device 106 to display the one or more recovered video frames 154 smoothly.

The physical layer (PHY) device 114 recovers the one or more transmission frames 152 from a physical medium in accordance with the one or more communication standards and/or protocols as described above to provide one or more recovered video frames 168.

The decoding processor 116 controls overall configuration and/or operation of the communication receiver 104 with respect to decoding of the one or more transmission frames 152. In the exemplary embodiment illustrated in FIG. 1, the decoding processor 116 recovers one or more coding parameters 158 from the one or more recovered video frames 168 to provide one or more coding parameters 170 to be used by the video decoder 120 to decode the one or more recovered video frames 168. As described above, the one or more coding parameters 158 are selectively chosen by the encoding processor 110 to allow the display device 106 to display the one or more recovered video frames 154 smoothly, for example, without jitter. In an exemplary embodiment, the decoding processor 116 can recover the one or more coding parameters 158 from one or more frame headers of the one or more recovered video frames 168 and/or one or more sequence headers corresponding to multiple encoded video frames from among the one or more recovered video frames 168. The one or more coding parameters 170 are substantially the same as the one or more coding parameters 158 and can include the initial display delay, the extra decoder picture buffer size, the decode frame rate, the display frame rate, and/or any other suitable parameter utilized by the one or more video coding formats implemented by the video encoder 106 to encode the one or more video frames 156 that will be apparent to those skilled in the relevant art(s) without departing from the spirit and scope of the present disclosure as described above.

The decoding verification circuit 118 verifies the video decoder 120 can decode the one or more recovered video frames 168 in such a manner to allow the display device 106 to display the one or more recovered video frames 154 smoothly. In the exemplary embodiment illustrated in FIG. 1, the decoding processor 116 provides the recovered one or more coding parameters 158 to the decoding verification circuit 118 as one or more coding parameters 172 for verification. In an exemplary embodiment, the decoding processor 116 provides the one or more coding parameters 172 to the decoding verification circuit 118 before the video decoder 120 commences to decode the one or more recovered video frames 168. The decoding verification circuit 118 models decoding of the one or more recovered video frames 168 using the one or more video coding formats of the video decoder 120 and the one or more coding parameters 172 to verify that the one or more recovered video frames 154 would be displayed by the display device 106 smoothly in a substantially similar manner as the encoding verification circuit 112 as described above. The decoding verification circuit 118, in response to this modeling, provides a modeling outcome 174 to the decoding processor 116 to indicate whether the one or more coding parameters 172 result in the one or more recovered video frames 154 being displayed by the display device 106 smoothly or with jitter. Thereafter, the encoding processor 110, the decoding processor 116, and/or the decoding verification circuit 118 can functionally cooperate to iteratively adjust the one or more coding parameters 172 until the one or more recovered video frames 154 are modeled by the decoding verification circuit 118 as being displayed by the display device 106 smoothly. Otherwise, the decoding processor 116 can provide the one or more coding parameters 172 which resulted in the one or more recovered video frames 154 being displayed by the display device 106 smoothly to the video decoder 120 as one or more coding parameters 170.

The video decoder 120 decodes the one or more recovered video frames 168 in accordance with the one or more video coding formats as described above utilizing the one or more coding parameters 170 received from the decoding processor 116 to provide one or more decoded video frames 176. For example, the video decoder 120 decodes the one or more recovered video frames 168 in accordance the decode frame rate received from the decoding processor 116. In the exemplary embodiment illustrated in FIG. 1, the video decoder 120 can control the overall configuration and arrangement of the decoder picture buffer 122. In an exemplary embodiment, the one or more recovered video frames 168 can include the one or more regular show frames, the one or more hidden frames, and/or the one or more show existing frames as described above. In this exemplary embodiment, the video decoder 120 can cause the decoder picture buffer 122 to store one or more video frames from among the one or more decoded video frames 176 and/or cause the decoder picture buffer 122 to release one or more video frames from among the one or more decoded video frames 176 being stored. For example, the video decoder 120 can cause the decoder picture buffer 122 to store the one or more video frames from among the one or more decoded video frames 176 in response to these frames the one or more regular show frames and/or the hidden frames as described above. In some situations, the video decoder 120 can access the hidden frames stored within the decoder picture buffer 122 to predict, for example intraframe or interframe, the one or more recovered video frames 154 that are to be displayed by the display device 106 from one or more recovered video frames 154 previously displayed by the display device 106. In another example, the video decoder 120 can cause the decoder picture buffer 122 to release the one or more video frames from among the one or more decoded video frames 176 being stored within the decoder picture buffer 122 in response to these frames being the one or more show existing frames. In another exemplary embodiment, the video decoder 120 can configure the decoder picture buffer 122 to operate in accordance with the one or more coding parameters 170. For example, the video decoder 120 can configure a storage allocation of the decoder picture buffer 122 to be in accordance with the extra decoder picture buffer size as described above.

The decoder picture buffer 122 stores the one or more decoded video frames 176 to be provided to the display device 106 as the one or more recovered video frames 154. The decoder picture buffer 122 can be implemented as a volatile memory storage device, such as a random-access memory (RAM) storage device to provide an example, which requires power to maintain the electronic data. The RAM storage device can be implemented in a dynamic random-access memory (DRAM), a static random-access memory (SRAM), and/or a non-volatile random-access memory (NVRAM), often referred to as a flash memory, configuration to provide some examples.

The display device 106 displays the one or more recovered video frames 154 in accordance with the one or more coding parameters 158. For example, the display device 106 displays the one or more recovered video frames 154 in accordance with the initial display delay and/or the display frame rate as outlined in the one or more coding parameters 158 to ensure the one or more recovered video frames 154 are displayed smoothly. In some situations, as to be described in detail below, the decoding processor 116 and/or the video decoder 120 cause the display device 106 to release, also referred to as flush, the one or more recovered video frames 154 according to a display order as determined by the video decoder 120. In these situations, the decoding processor 116 and/or the video decoder 120 cause the display device 106 to flush the one or more recovered video frames 154 once the one or more recovered video frames 154 have been displayed.

The display device 106 can represent a standalone electronic visual display. This standalone electronic visual display represents any suitable electronic visual display that is capable of displaying video that will be apparent to those skilled in the relevant art(s) without departing from the spirit and scope of the present disclosure. These suitable electronic visual displays can include television sets, computer monitors, and/or digital signage to provide some examples. In some situations, the display device 106 can be integrated with other electronic, mechanical, and/or electro-mechanical devices, such as the communication receiver 104 to provide an example. For example, the communication receiver 104 and the display device 106 can be integrated within an all-in-one computer, a tablet computer, a smartphone, a personal digital assistant (PDA), a satellite navigation device, a video gaming device, a kiosk system in retail and tourist settings, a point of sale system, an Internet-connected appliance or an automatic teller machine (ATM) to provide some examples.

Figure 2:
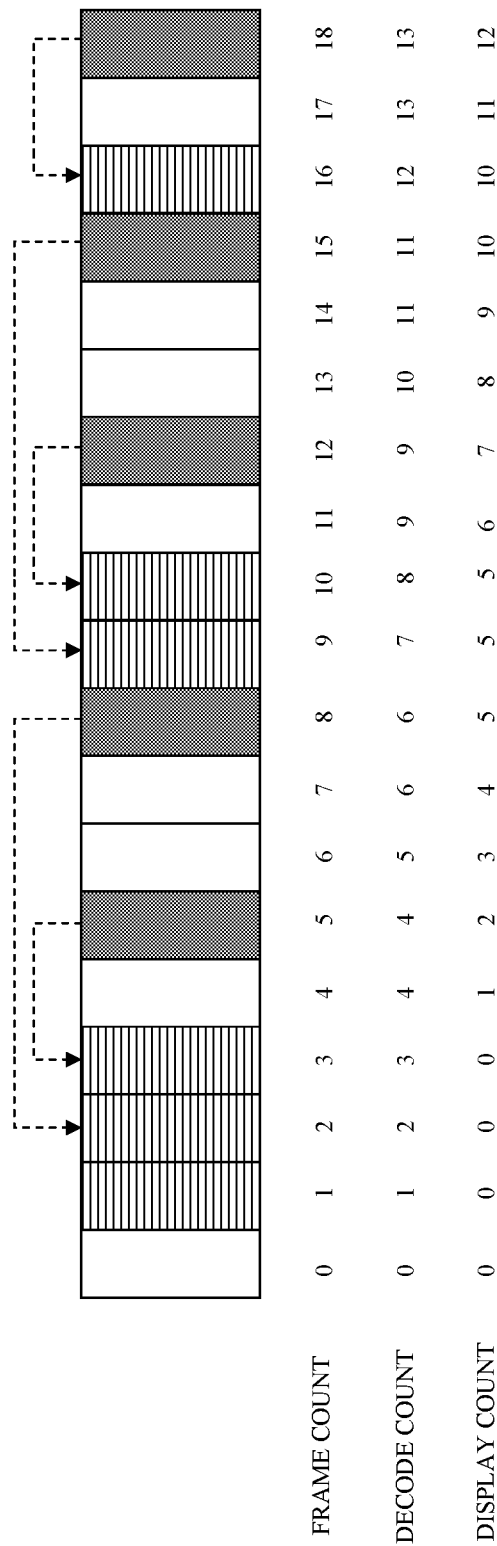
FIG. 2 illustrates an exemplary video frame that can be implemented within the exemplary video communication environment according to an exemplary embodiment of the present disclosure.

Exemplary Encoded Video Frame That Can Be Implemented Within the Exemplary Video Communication Environment FIG. 2 illustrates an exemplary video frame that can be implemented within the exemplary video communication environment according to an exemplary embodiment of the present disclosure. A sequence of encoded video frames 200 can include one or more regular show frames, one or more hidden frames, and/or one or more show existing frames. In the exemplary embodiment illustrated in FIG. 2, a type, namely, whether the regular show frames, the hidden frames, or the show existing frame, for each video frame from among the sequence of encoded video frames 200 may be inserted into one or more frame headers of the sequence of encoded video frames 200 and/or one or more sequence headers corresponding to multiple encoded video frames from among the sequence of encoded video frames 200. The one or more regular show frames, the one or more hidden frames, and the one or more show existing frames within the sequence of encoded video frames 200 as illustrated in FIG. 2 are for exemplary purposes only. Those skilled in the relevant art(s) will recognize the one or more regular show frames, the one or more hidden frames, and the one or more show existing frames within the sequence of encoded video frames 200 within the sequence of encoded video frames 200 are dependent upon the video represented by the sequence of encoded video frames 200. As such, the one or more regular show frames, the one or more hidden frames, and the one or more show existing frames within the sequence of encoded video frames 200 can vary from that illustrated in FIG. 2 for different types of video.

The one or more regular show frames, illustrated using white shading in FIG. 2, represent one or more video frames within the sequence of encoded video frames 200 that are decoded by a video decoder, such as the video encoder 120 of the communications receiver 104 as described above in FIG. 1 to provide an example, and displayed by a display device, such as the display device 106 as described above in FIG. 1 to provide an example. The one or more regular show frames represent a digital sequence of images or pictures, referred to as video, which can be sequentially displayed by the display device in rapid succession to form a moving picture. The video can represent a sporting contest, a musical concert, a speech, a movie, a television sitcom, a television reality show, and/or any other suitable event which will be apparent to those skilled in the relevant art(s) without departing from the spirit and scope of the present disclosure.

The one or more hidden frames, illustrated using horizontal shading in FIG. 2, represent one or more video frames within the sequence of encoded video frames 200 that are decoded by the communications receiver and not displayed by the display device. The one or more hidden frames represent reference frames that can be utilized by the video decoder to predict, for example intraframe or interframe, video frames based upon previous video frames from among the sequence of encoded video frames 200 and/or future video frames from among the sequence of encoded video frames 200. In an exemplary embodiment, the video decoder can predict these video frames by accounting for motion of the camera and/or objects in the sequence of encoded video frames 200. For example, the one or more hidden frames can be indicative of similarities and/or differences within a first video frame from among the sequence of encoded video frames 200 and/or between the first video frame and a previously occurring, second video frame, from among the sequence of encoded video frames 200. In this example, the one or more hidden frames can include similarities and/or differences between, for example, temporally adjacent frames (interframe) or spatially adjacent pixels (intraframe). In an exemplary embodiment, these similarities and/or differences can be represented as one or more motion vectors within the one or more hidden frames.

The one or more show existing frames, illustrated using dark shading in FIG. 2, represent one or more video frames within the sequence of encoded video frames 200 that are not decoded by the video decoder, but are displayed by the display device. The one or more show existing frames represent reference frames to indicate one or more video frames that have been previously decoded by the video decoder and/or one or more video frames that have been previously displayed by the display device. In some situations, these one or more video frames can represent one or more one or more regular show frames that have been previously decoded and/or previously displayed.

In the exemplary embodiment illustrated in FIG. 2, the sequence of encoded video frames 200 includes video frame 0 through video frame 18. In this exemplary embodiment, video frame 0, video frame 4, video frame 6, video frame 7, video frame 11, video frame 13, video frame 14, and video frame 17 represent regular show frames. Also, in this exemplary embodiment, video frame 1, video frame 2, video frame 3, video frame 9, video frame 10, and video frame 16 represent hidden frames. Further, in this exemplary embodiment, the video frame 5, video frame 8, video frame 12, video frame 15, and video frame 18 represent show existing frames. The video frame 5 indicates video frame 3 is to be displayed by the display device, video frame 8 indicates video frame 2 is to be displayed by the display device, video frame 12 indicates video frame 10 is to be displayed by the display device, video frame 15 indicates video frame 9 is to be displayed by the display device, and video frame 18 indicates video frame 16 is to be displayed by the display device.

Moreover, FIG. 2 graphically illustrates a frame count, a decode count, and a display count for the sequence of encoded video frames 200. The frame count represents a reference indexing of encoded video frames from among the sequence of encoded video frames 200. In the exemplary embodiment illustrated in FIG. 2, the decode count and the display count illustrate exemplary operations of the video decoder and the display device, respectively. However, the decode count and the display count as illustrated in FIG. 2 are for exemplary purposes only. Those skilled in the relevant art(s) will recognize the decode count and the display count can be different for difference sequences of encoded video frames without departing from the spirit and scope of the present disclosure. As described above, the one or more regular show frames represent one or more video frames within the sequence of encoded video frames 200 that are decoded by the video decoder and displayed by the display device. As such, the decode count and the display count as illustrated in FIG. 2 increment for each of the one or more regular show frames indicating these frames are decoded by the video decoder and displayed by the display device. Moreover, the one or more hidden frames represent one or more video frames within the sequence of encoded video frames 200 that are decoded by the communications receiver and not displayed by the display device. As such, the decode count, not the display count, as illustrated in FIG. 2 increments for each of the one or more hidden frames indicating these frames are decoded by the video decoder and not displayed by the display device. Furthermore, the one or more show existing frames represent one or more video frames within the sequence of encoded video frames 200 that are not decoded by the video decoder, but are displayed by the display device. As such, the display count, not the decode count, as illustrated in FIG. 2 increments for the each of the one or more show existing frames indicating these frames are displayed by the display device.

Figure 3A:
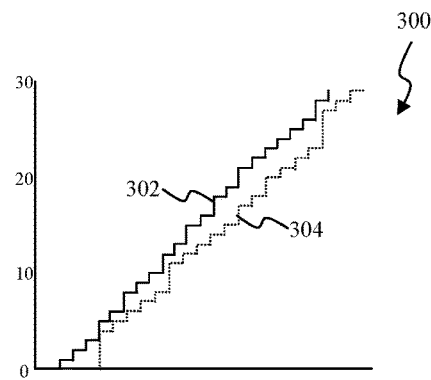
FIG. 3A through FIG. 3C graphically illustrate exemplary operations of encoding verification circuits and/or decoding verification circuits that can be implemented within the exemplary video communication environment according to exemplary embodiments of the present disclosure.
Figure 3B:
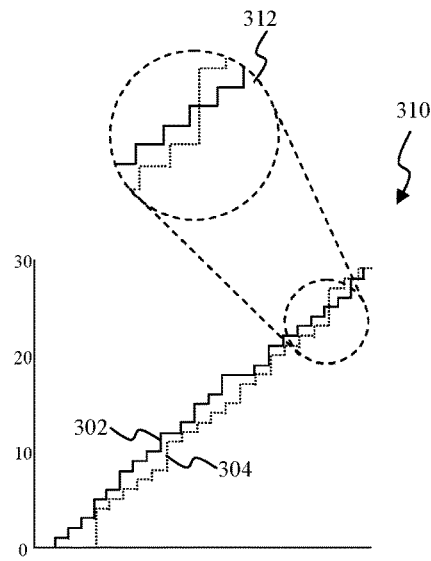
Figure 3C:
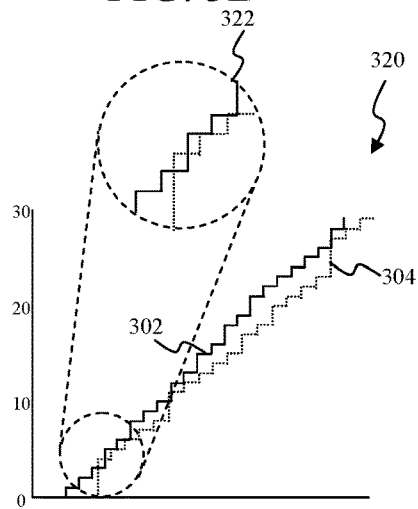

Exemplary Operation of an Exemplary Encoding Verification Circuit and/or an Exemplary Decoding Verification Circuit That Can Be Implemented Within the Exemplary Video Communication Environment FIG. 3A through FIG. 3C graphically illustrate exemplary operations of encoding verification circuits and/or decoding verification circuits that can be implemented within the exemplary video communication environment according to exemplary embodiments of the present disclosure. As illustrated in FIG. 3A through FIG. 3C, the encoding verification circuit 112 as described above in FIG. 1 and/or the decoding verification circuit 118 as described above in FIG. 1 model decoding of encoded video frames using one or more coding parameters, such as the initial display delay, the extra decoder picture buffer size, the decode frame rate, and/or the display frame rate to provide some examples. In the exemplary embodiments illustrated in FIG. 3A through FIG. 3C, the encoding verification circuit 112 and/or the decoding verification circuit 118 model the dynamics of decoding timing and/or display timing. In these exemplary embodiments, the encoding verification circuit 112 and/or the decoding verification circuit 118 models outputting of decoded video frames 302 by the video decoder 120 as described above in FIG. 1 and outputting of video display frames 304 by the display device 106 as described above in FIG. 1 to verify the video display frames 304 can be displayed smoothly by the display device 106. The decoded video frames 302 and the video display frames 304 are displayed in FIG. 3A through FIG. 3C for different sets of coding parameters. In FIG. 3A through FIG. 3C, the x-axis represents time and the y-axis represents an indexing, or frame count, of frames within the encoded video frames.

In the exemplary embodiment illustrated in FIG. 3A, the encoding verification circuit 112 and/or the decoding verification circuit 118 models the outputting of the decoded video frames 302 and the outputting of the video display frames 304 in accordance with a first set of coding parameters 300. The first set of coding parameters 300 can include an initial display delay of sixty (60) milliseconds (ms), an extra decoder picture buffer size of one (1), a decode frame rate of sixty-six (66) frames per second (fps), and a display frame rate of sixty (60) fps to provide an example. As illustrated in FIG. 3A, the display device 106 can continuously, or near continuously, display the video display frames 304 smoothly, for example, without jitter. In other words, the model of the decoded video frames 302 does not intersect the model of the decoded video display frames 304 in FIG. 3A indicating the decoded video frames 302 are available to be displayed by the display device 106 as the video display frames 304. In this situation, the encoding verification circuit 112 and/or the decoding verification circuit 118 can provide the modeling outcome 166 and/or the modeling outcome 174, respectively, to indicate the first set of coding parameters 300 result in the video display frames 304 being displayed by the display device 106 smoothly.

However, as illustrated in FIG. 3B and FIG. 3C, the display device 106 needs to wait or pause before displaying the video display frames 304 when a second set of coding parameters 310 and a third set of coding parameters 312, respectively, are used resulting in an underflow condition. The second set of coding parameters 310 are substantially similar to the first set of coding parameters 300, but the second set of coding parameters 310 includes an extra decoder picture buffer size of zero (0). The third set of coding parameters 320 are substantially similar to the first set of coding parameters 300, but the third set of coding parameters 320 includes an initial display delay of fifty (50) milliseconds (ms). As illustrated in an exploded view 312 and in a exploded view 322, this underflow condition occurs when the model of the decoded video frames 302 intersects the model of the decoded video frames 302. This intersection occurs when the display device 106 is ready and/or available to display the video display frames 304 but the video decoder 120 has not outputted the decoded video frames 302, namely, has not completed decoding of the encoded video frames. As a result, the display device 106 needs to wait or pause before displaying the video display frames 304 causing jitter in the video display frames 304 being displayed by the display device 106. In this situation, the encoding verification circuit 112 and/or the decoding verification circuit 118 can provide the modeling outcome to indicate the second set of coding parameters 310 result in the video display frames 304 being displayed by the display device 106 with jitter.

Figure 4:
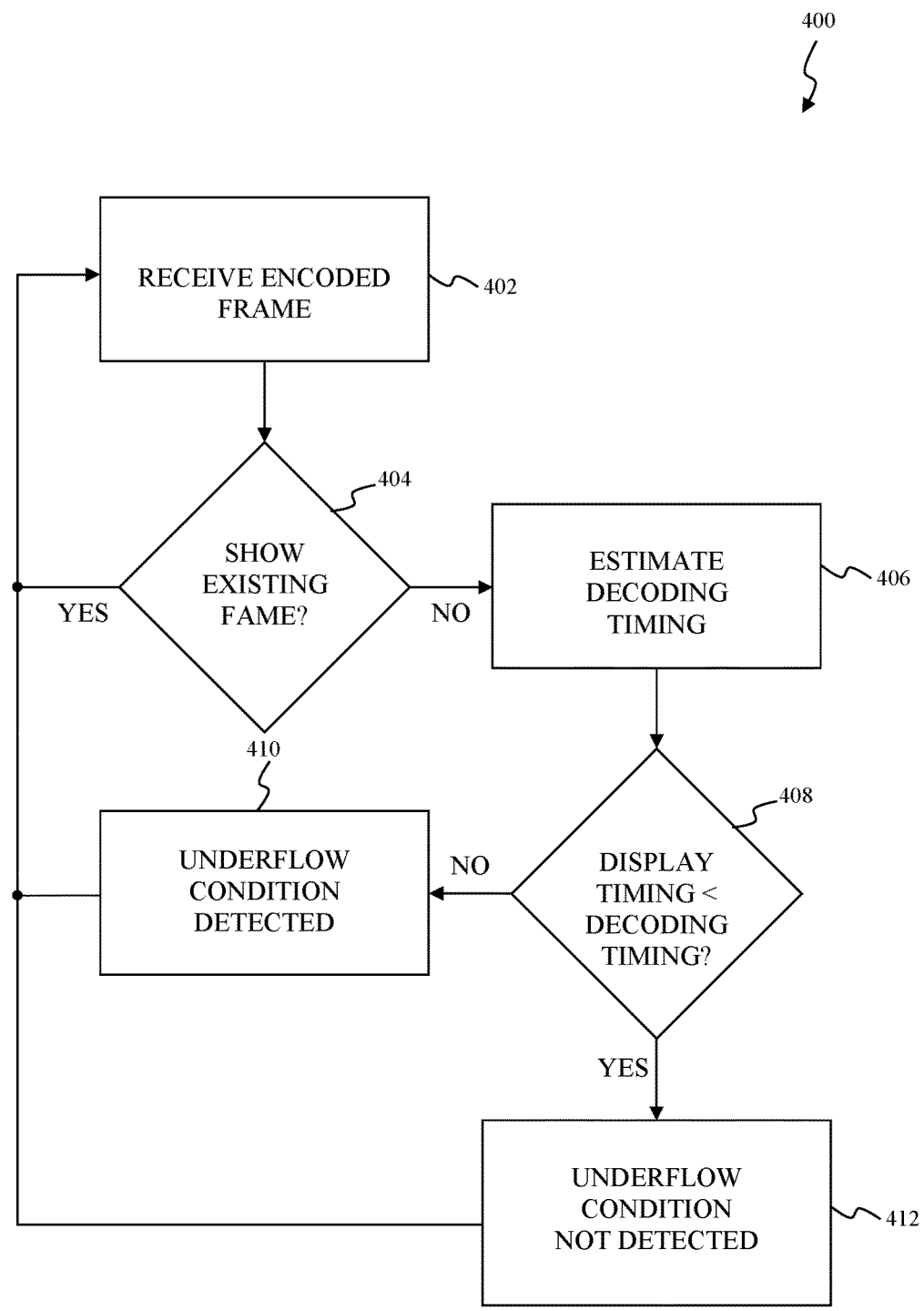
FIG. 4 illustrates a flowchart of a first exemplary operational control flow for the exemplary encoding verification circuits and/or decoding verification circuits according to an exemplary embodiment of the present disclosure.

Exemplary Operational Control Flows for the Exemplary Encoding Verification Circuit and/or the Exemplary Decoding Verification Circuit FIG. 4 illustrates a flowchart of a first exemplary operational control flow for the exemplary encoding verification circuits and/or decoding verification circuits according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for an encoding verification circuit, such as the encoding verification circuit 112 to provide an example, and/or a decoding verification circuit, such as the decoding verification circuit 118 to provide an example, to model the dynamics of decoding timing and/or display timing to detect whether an underflow condition would occur if encoded video frames, such as the encoded video frames 160 and/or the one or more recovered video frames 168 to provide some examples, were to be decoded using one or more coding parameters, such as the one or more coding parameters 158 and/or the one or more coding parameters 170 to provide some examples.

At operation 402, the exemplary operational control flow 400 receives an encoded video frame from among the encoded video frames. In the exemplary embodiment illustrated in FIG. 4, the encoded video frame has previously been encoded by a video encoder, such as the video encoder 106 to provide an example, in accordance with the one or more video coding formats as described above utilizing the one or more coding parameters. The one or more coding parameters can include the initial display delay, the extra decoder picture buffer size, the decode frame rate, the display frame rate, and/or any other suitable parameter utilized by the one or more video coding formats that will be apparent to those skilled in the relevant art(s) without departing from the spirit and scope of the present disclosure as described above in FIG. 1.

At operation 404, the exemplary operational control flow 400 determines whether the encoded video frame from operation 402 is a show existing frame. As described above in FIG. 1, the show existing frame represents an encoded video frame that is not decoded but is displayed. In the exemplary embodiment illustrated in FIG. 4, a type, namely, whether the regular show frame, the hidden frame, or the show existing frame, for the encoded video frame from operation 402 may be inserted into a frame header of the encoded video frame from operation 402 and/or one or more sequence headers corresponding to the encoded video frames. The exemplary operational control flow 400 reverts to operation 402 to receive another encoded video frame from among the encoded video frames when the encoded video frame from operation 402 is the show existing frame. Otherwise, the encoded video frame from operation 402 is a regular show frame or a hidden frame and the exemplary operational control flow 400 proceeds to operation 404. As described above in FIG. 1, the regular show frame and the hidden frame represent encoded video frames that are decoded with only the regular show frame being displayed.

At operation 406, the exemplary operational control flow 400 estimates the decoding timing needed to decode the encoded video frame from operation 402 to output a decoded video frame. In the exemplary embodiment illustrated in FIG. 4, the decoding timing represents a duration of time needed by a video decoder, such as the video decoder 120, to decode the regular show frame or the hidden frame in accordance with the one or more video coding formats utilizing the one or more coding parameters as described above in FIG. 1. In an exemplary embodiment, the decoding timing can be estimated according to:

$$D_T = \frac{1}{DEC_{FR}}, \quad (1)$$

where DT represents the decoding timing and $DEC_{FR}$ represents the decode frame rate for the encoded video frame as specified within the one or more coding parameters.

At operation 408, the exemplary operational control flow 400 compares the decoding time from operation 406 with the display timing of a display device, such as the display device 106 to provide an example. In an exemplary embodiment illustrated in FIG. 4, the display timing of the display device, also referred to as a next frame time, represents an instance in time in which the display device has completed displaying a previous decoded video frame and is available to commence to display the decoded video frame from operation 406. In an exemplary embodiment, the display timing of the display device can be estimated according to:

$$D_T = \frac{1}{DIS_{FR}}, \quad (2)$$

where DT represents the display timing of the display device and $DIS_{FR}$ represents the display frame rate of the display device as specified within the one or more coding parameters. In another exemplary embodiment, the display timing of the display device may be inserted into a frame header of the encoded video frame from operation 402 and/or a sequence header corresponding to multiple encoded video frames from among the encoded video frames. The operational control flow 400 proceeds to operation 410 when the display time is less than the decoding time from operation 406. Otherwise, the operational control flow proceeds to operation 412 when the display time is not less than the decoding time from operation 406.

At operation 410, the exemplary operational control flow 400 detects an underflow condition when the display time from operation 408 is less than the decoding time from operation 406. The underflow condition occurs when the display device is available to commence displaying of the decoded video frame from operation 406 but the exemplary operational control flow 400 does not have sufficient time to decode the encoded video frame from operation 402 at operation 406. Thereafter, the exemplary operational control flow 400 reverts to operation 402 to receive another encoded video frame from among the encoded video frames. In some situations, the exemplary operational control flow 400 can provide a modeling outcome, such as the modeling outcome 166 and/or the modeling outcome 174 to provide some examples, to indicate the underflow condition has been detected at operation 410.

At operation 412, the exemplary operational control flow 400 does not detect the underflow condition when the display time from operation 408 is not less than the decoding time from operation 406. Thereafter, the exemplary operational control flow 400 reverts to operation 402 to receive another encoded video frame from among the encoded video frames. In some situations, the exemplary operational control flow 400 can provide the modeling outcome to indicate the underflow condition has been not detected at operation 412.

Figure 5:
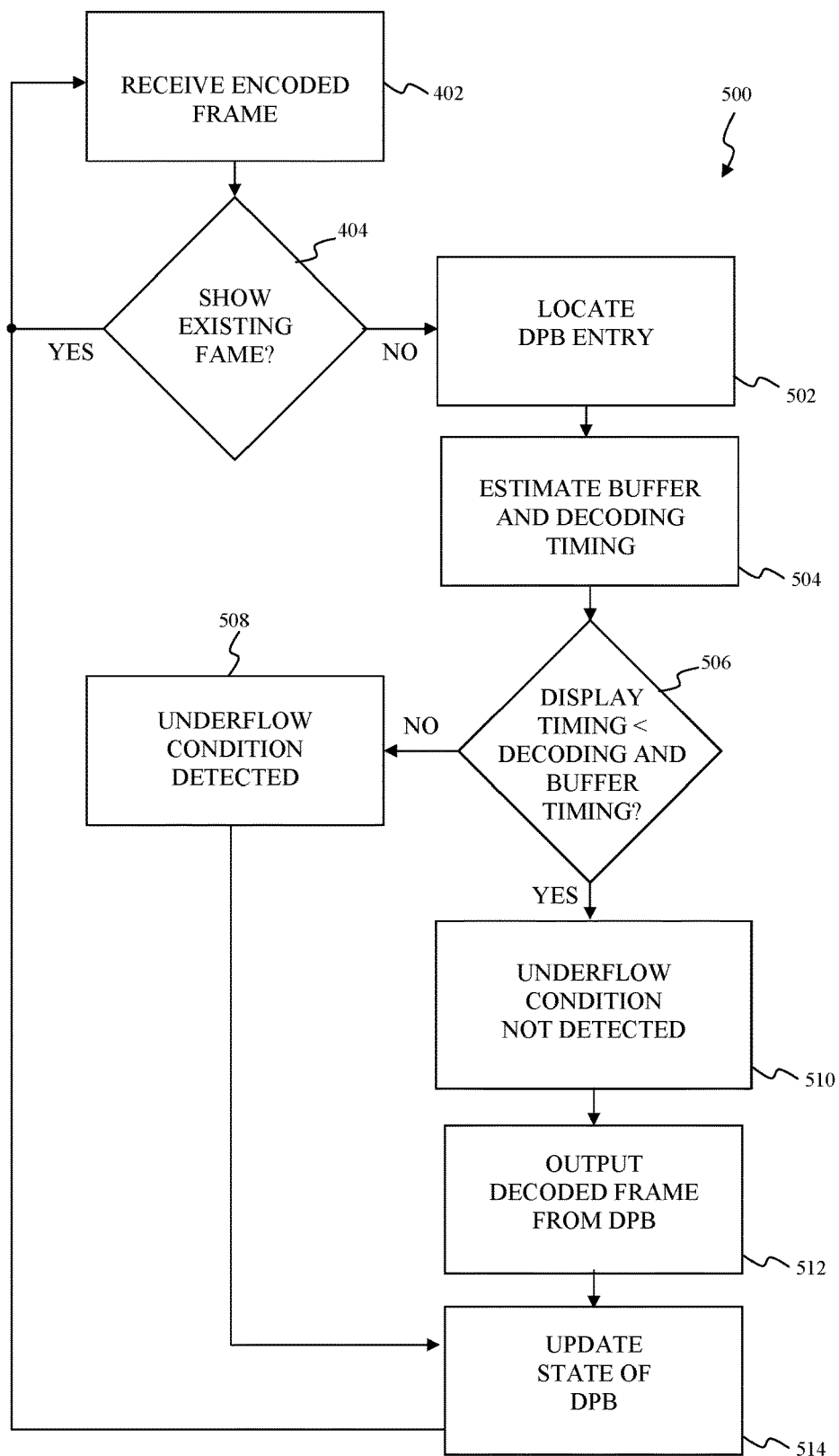
FIG. 5 illustrates a flowchart of a second exemplary operational control flow for the exemplary encoding verification circuits and/or decoding verification circuits according to an exemplary embodiment of the present disclosure.

FIG. 5 illustrates a flowchart of a second exemplary operational control flow for the exemplary encoding verification circuits and/or decoding verification circuits according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 500 for an encoding verification circuit, such as the encoding verification circuit 112 to provide an example, and/or a decoding verification circuit, such as the decoding verification circuit 118 to provide an example, to model the dynamics of decoding timing and/or display timing to detect whether an underflow condition would occur if encoded video frames, such as the encoded video frames 160 and/or the one or more recovered video frames 168 to provide some examples, were to be decoded using one or more coding parameters, such as the one or more coding parameters 158 and/or the one or more coding parameters 170 to provide some examples.

In the exemplary embodiment illustrated in FIG. 5, the exemplary operational control flow 500 receives an encoded video frame from among the encoded video frames at operation 402 as described above in FIG. 4 and determines whether the encoded video frame from operation 402 is a show existing frame at operation 404 as described above in FIG. 4. The exemplary operational control flow 500 reverts to operation 402 to receive another encoded video frame from among the encoded video frames when the encoded video frame from operation 402 is the show existing frame 404 as described above in FIG. 4. Otherwise, the encoded video frame from operation 402 is a regular show frame or a hidden frame and the exemplary operational control flow 500 proceeds to operation 502.

At operation 502, the exemplary operational control flow 500 locates a decoder picture buffer (DPB) entry within a decoder picture buffer, such as the decoder picture buffer 122 to provide an example, for storing a decoded video frame corresponding to the encoded video frame from operation 402. As described above in FIG. 1, a video decoder, such as the video decoder to provide an example, decodes the encoded video frame from operation 402 in accordance with the one or more video coding formats utilizing the one or more coding parameters as described above to provide a decoded video frame. Thereafter, as described in FIG. 1, the decoder picture buffer stores the decoded video frame. In the exemplary embodiment illustrated in FIG. 5, the decoded video frames stored within the decoder picture buffer are addressed, or indexed, by DPB entries. In this exemplary embodiment, the exemplary operational control flow 500 locates an empty DPB entry, namely, a decoded video frame which has been previously displayed, or a DPB entry corresponding to a previously displayed decoded video frame within the decoder picture buffer in which to store the decoded video frame. In an exemplary embodiment, the exemplary operational control flow 500 can store states of the decoded video frames stored within the decoder picture buffer. For example, these states can include whether the DPB entries correspond to empty DPB entries, reference DPB entries corresponding to one or more decoded video frames can be used to predict one or more other decoded video frames, and/or non-reference DPB entries corresponding to one or more decoded video frames ready to be displayed.

At operation 504, the exemplary operational control flow 500 estimates buffer and decoding time needed to decode the encoded video frame from operation 402 to output a decoded video frame and to store this decoded video frame within the decoder picture buffer. In the exemplary embodiment illustrated in FIG. 5, the decoding timing represents a duration of time needed by the video decoder to decode the regular show frame or the hidden frame in accordance with the one or more video coding formats utilizing the one or more coding parameters as described above in FIG. 1. In an exemplary embodiment, the decoding timing can be estimated according to:

$$D_T = \frac{1}{DEC_{FR}}, \quad (3)$$

where DT represents the decoding timing and $DEC_{FR}$ represents the decode frame rate for the encoded video frame as specified within the one or more coding parameters. And, the buffer timing represents a duration of time needed by the decoder to get an available frame buffer from the decoder picture buffer for storing and/or retrieving this decoded video frame. A frame buffer is regarded as available if it will neither be used as a reference frame nor be displayed in the future.

At operation 506, the exemplary operational control flow 500 compares the buffer and decoding time from operation 504 with the display timing of a display device, such as the display device 106 to provide an example. In an exemplary embodiment illustrated in FIG. 5, the display timing of the display device, also referred to as a next frame time, represents an instance in time in which the display device has completed displaying a previous decoded video frame and is available to commence to display the decoded video frame from operation 504. In an exemplary embodiment, the display timing of the display device can be estimated according to:

$$D_T = \frac{1}{DIS_{FR}}, \quad (4)$$

where DT represents the display timing of the display device and $DIS_{FR}$ represents the display frame rate of the display device as specified within the one or more coding parameters. In another exemplary embodiment, the display timing of the display device may be inserted into a frame header of the encoded video frame from operation 402 and/or a sequence header corresponding to multiple encoded video frames from among the encoded video frames. The operational control flow proceeds to operation 508 when the display time is less than the buffer and decoding time from operation 504. Otherwise, the operational control flow proceeds to operation 508 when the display time is less than the buffer and decoding time from operation 504.

At operation 508, the exemplary operational control flow 500 detects an underflow condition when the display time from operation 506 is less than the buffer and decoding time from operation 504. The underflow condition occurs when the display device is available to commence displaying of the decoded video frame from operation 504 but the exemplary operational control flow 500 does not have sufficient time to decode and store the encoded video frame from operation 402 at operation 504. Thereafter, the exemplary operational control flow 500 proceeds to operation 514. In some situations, the exemplary operational control flow 500 can provide a modeling outcome, such as the modeling outcome 166 and/or the modeling outcome 174 to provide some examples, to indicate the underflow condition has been detected at operation 508.

At operation 510, the exemplary operational control flow 500 does not detect the underflow condition when the display time from operation 506 is not less than the buffer and decoding time from operation 504. Thereafter, the exemplary operational control flow 500 proceeds to operation 512. In some situations, the exemplary operational control flow 500 can provide the modeling outcome to indicate the underflow condition has been not detected at operation 412.

At operation 512, the exemplary operational control flow 500 models the outputting of the decoded video frame from operation 504 from the decoder picture buffer to be displayed by the display device. The exemplary operational control flow 500 models retrieving of the DPB entry from operation 502 from the decoder picture buffer corresponding to the decoded video frame from operation 504.

At operation 514, the exemplary operational control flow 500 updates the states of the decoded video frames stored within the decoder picture buffer. As described above, these states can include whether the DPB entries correspond to empty DPB entries, reference DPB entries corresponding to one or more decoded video frames can be used to predict one or more other decoded video frames, and/or non-reference DPB entries corresponding to one or more decoded video frames ready to be displayed. For example, the video decoder can utilize one or more reference DPB entries corresponding to one or more decoded video frames stored within the decoder picture buffer to predict the decoded video frame from operation 504. In this example, the exemplary operational control flow 500 can update the state of these one or more reference DPB entries to be non-reference DPB entries when these decoded video frames are no longer needed to predict decoded video frames. Thereafter, the exemplary operational control flow 500 reverts to operation 402 to receive another encoded video frame from among the encoded video frames.

Figure 6:
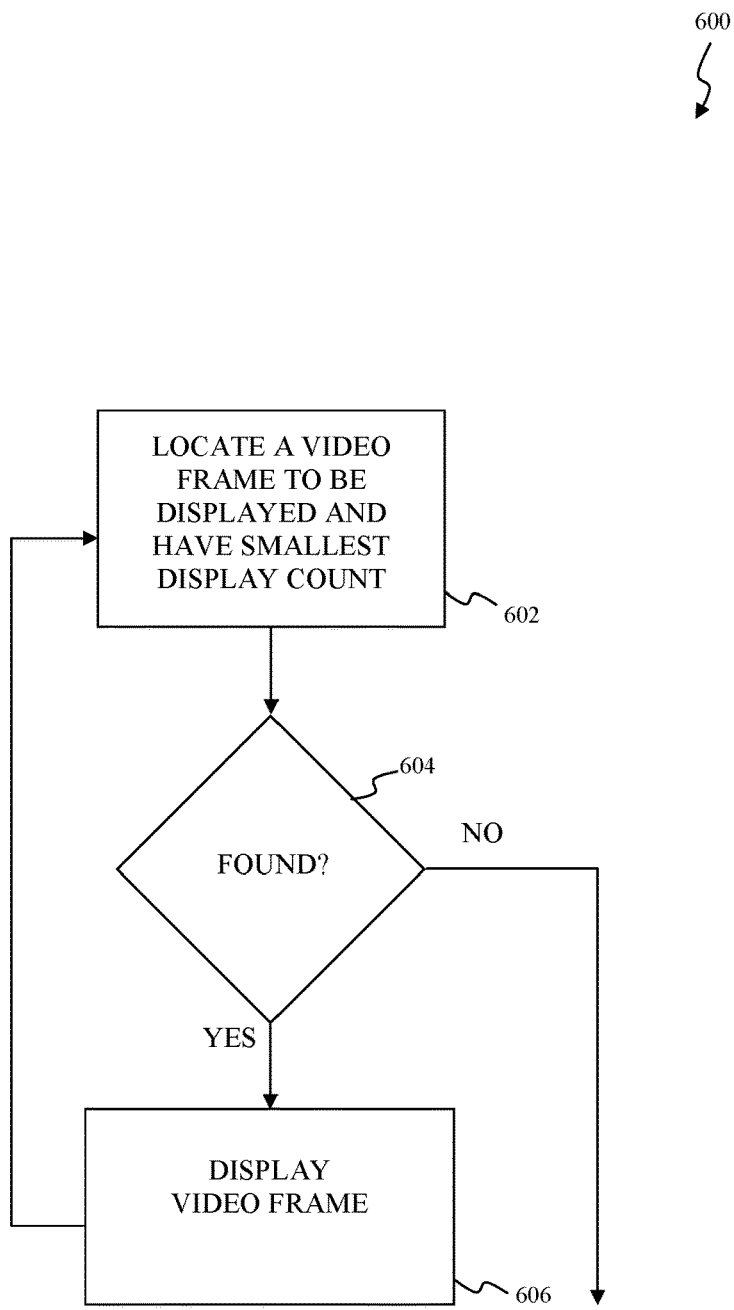
FIG. 6 illustrates a flowchart of a third exemplary operational control flow for the exemplary encoding verification circuits and/or decoding verification circuits according to an exemplary embodiment of the present disclosure.

FIG. 6 illustrates a flowchart of a third exemplary operational control flow for the exemplary encoding verification circuits and/or decoding verification circuits according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 600 for a decoding processor, such as the decoding processor 116 to provide an example, and/or a video decoder, such as the video decoder 120 to provide an example, to release, also referred to as flush, one or more recovered video frames, such as one or more of the one or more recovered video frames 154 to provide an example, according to a display order as determined by the video decoder from a display device, such as the display device 106 to provide an example.

At operation 602, the exemplary operational control flow 600 locates a decoded video frame stored within a decoder picture buffer, such as the decoder picture buffer 122 to provide an example, and/or the display device having the smallest display count. In the exemplary embodiment illustrated in FIG. 6, the decoded video frame represents an encoded video frame that has been decoded by the video decoder in accordance with the one or more video coding formats as described above utilizing the one or more coding parameters. The one or more coding parameters can include the initial display delay, the extra decoder picture buffer size, the decode frame rate, the display frame rate, and/or any other suitable parameter utilized by the one or more video coding formats that will be apparent to those skilled in the relevant art(s) without departing from the spirit and scope of the present disclosure as described above in FIG. 1. As part of this decoding, the video decoder assigns as a display order, for example, using display counts, to the decoded video frames representing an order in which the display device is to display the decoded video frames. In an exemplary embodiment, those decoded video frames having smaller display counts are to be displayed by the display device before those decoded video frames having larger display counts.

At operation 604, the exemplary operational control flow 600 determines whether the decoded video frame from operation 602 has been displayed by the display device. In an exemplary embodiment, the display can set a flag associated with the decoded video frame from a first logical value, such as a logical one to provide an example, indicating the decoded video frame has not yet been displayed to a second logical value, such as a logical zero to provide an example, indicating the decoded video frame has been displayed. In this exemplary embodiment, the exemplary operational control flow 600 locates this flag within the decoded video frame from operation 602 frame to determine whether the decoded video frame from operation 602 has been displayed by the display device. When decoded video frame from operation 602 is found and the exemplary operational control flow 600 proceeds to operation 606. Otherwise, all frames in the decoder picture buffer have been displayed already and the exemplary operational control flow 600 ends. At operation 606, the exemplary operational control flow 600 displays the decoded video frame from operation 602 and indicates the decoded video frame has been displayed by for example, setting the logical value to be the first logical value, such as a logical one to provide an example.

CONCLUSION

The foregoing Detailed Description referred to accompanying figures to illustrate exemplary embodiments consistent with the disclosure. References in the foregoing Detailed Description to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The foregoing Detailed Description is not meant to limiting. Rather, the scope of the disclosure is defined only in accordance with the following claims and their equivalents. It is to be appreciated that the foregoing Detailed Description, and not the following Abstract section, is intended to be used to interpret the claims. The Abstract section can set forth one or more, but not all exemplary embodiments, of the disclosure, and thus, is not intended to limit the disclosure and the following claims and their equivalents in any way.

The exemplary embodiments described within foregoing Detailed Description have been provided for illustrative purposes, and are not intended to be limiting. Other exemplary embodiments are possible, and modifications can be made to the exemplary embodiments while remaining within the spirit and scope of the disclosure. The foregoing Detailed Description has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The foregoing Detailed Description fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A communication transmitter, comprising:
   a video encoding circuit;
   an encoding verification circuit;
   a physical layer (PHY) device; and
   an encoding circuit configured to determine one or more coding parameters for encoding a plurality of video frames and to provide the one or more coding parameters to the video encoding circuit, wherein
   the video encoding circuit is configured to encode the plurality of video frames in accordance with one or more video coding formats that utilize the one or more coding parameters to generate a plurality of encoded video frames,
   the PHY device is configured to communicate the plurality of encoded video frames via a network to a communication receiver,
   the encoding verification circuit is configured to verify, without feedback from the communication receiver, whether the plurality of encoded video frames is to be displayed without jitter after being decoded with the one or more coding parameters, and
   the encoding circuit and the encoding verification circuit are further configured to cooperate to iteratively adjust the one or more coding parameters, without feedback from the communication receiver, until the plurality of encoded video frames are displayable, by a display device communicably connected to the communication receiver, without jitter after being decoded with the one or more coding parameters.

2. The communication transmitter of claim 1, wherein the one or more coding parameters comprise:
   an initial display delay representing an initial delay in time before the display device commences to display the plurality of encoded video frames after being decoded with the one or more coding parameters;
   an extra decoder picture buffer size representing an extra size of a decoder picture buffer added to a conventional decoder picture buffer size to store the plurality of encoded video frames after being decoded with the one or more coding parameters;
   a decode frame rate representing a rate of a video decoder in decoding the plurality of encoded video frames; or
   a display frame rate representing a rate of a display device in displaying the plurality of encoded video frames after being decoded with the one or more coding parameters.

3. The communication transmitter of claim 1, wherein the plurality of encoded video frames comprises:
   a regular show frame which is to be decoded by a video decoder and to be displayed by the display device,
   a hidden frame which is to be decoded by the video decoder and not to be displayed by the display device, and
   a show existing frame which is not to be decoded by the video decoder and to be displayed by the display device.

4. The communication transmitter of claim 1, wherein the encoding verification circuit is further configured to verify the plurality of encoded video frames before the video encoding circuit commences to encode the plurality of video frames.

5. The communication transmitter of claim 1, wherein the encoding verification circuit is further configured to model dynamics of:
   decoding the plurality of encoded video frames to generate the plurality of decoded video frames,
   storing of the plurality of decoded video frames, and
   displaying the plurality of decoded video frames,
   to verify the plurality of encoded video frames, after being decoded with the one or more coding parameters, is to be displayed without the jitter.

6. The communication transmitter of claim 5, wherein the encoding verification circuit is configured to detect whether an underflow condition occurs in a decoder picture buffer in a case that the plurality of encoded video frames is decoded in accordance with the one or more video coding formats utilizing the one or more coding parameters.

7. The communication transmitter of claim 1, wherein the PHY device is configured to format the plurality of encoded video frames in accordance with one or more communication standards for transmission to the communications receiver.

8. A communication receiver, comprising:
   a physical layer (PHY) device configured to receive a plurality of encoded video frames via a network from a communication transmitter;
   a decoding circuit configured to recover one or more coding parameters from the plurality of encoded video frames;
   a decoding verification circuit configured to verify whether the plurality of encoded video frames is to be displayed without jitter after being decoded by a video decoder with the one or more coding parameters by modeling dynamics of decoding of the plurality of encoded video frames by the video decoder based on the one or more coding parameters; and a decoder picture buffer configured to store the plurality of encoded video frames for decoding by the video decoder, wherein the decoding circuit and the decoding verification circuit are further configured to cooperate to iteratively adjust the one or more coding parameters until the plurality of encoded video frames are displayable by a display device communicably connected to the communication receiver, without jitter after being decoded with the one or more coding parameters by the video decoder.

9. The communication receiver of claim 8, wherein the one or more coding parameters comprise:

an initial display delay representing an initial delay in time before a display device commences to display the plurality of decoded video frames;

an extra decoder picture buffer size representing an extra size of a decoder picture buffer added to a conventional decoder picture buffer size to store the plurality of encoded video frames after being decoded with the one or more coding parameters;

a decode frame rate representing a rate of the video decoder in decoding the plurality of encoded video frames; or a display frame rate representing a rate of a display device in displaying the plurality of decoded video frames.

10. The communication receiver of claim 8, wherein the plurality of encoded video frames comprises:

a regular show frame which is to be decoded by the video decoder and to be displayed by a display device, a hidden frame which is to be decoded by the video decoder and not to be displayed by the display device, and a show existing frame which is not to be decoded by the video decoder and to be displayed by the display device.

11. The communication receiver of claim 8, wherein the video decoder is configured to decode the plurality of encoded video frames in accordance with one or more video coding formats utilizing the one or more coding parameters to provide a plurality of decoded video frames.

12. The communication receiver of claim 8, wherein a rate at which the video decoder decodes the plurality of encoded video frames is greater than a rate of the display device in displaying the plurality of decoded video frames stored in the decoder picture buffer.

13. The communication receiver of claim 8, wherein to verify the plurality of encoded video frames, the decoding verification circuit is configured to model the dynamics of:

decoding the plurality of encoded video frames to generate a plurality of decoded video frames, storing of the plurality of encoded video frames, when decoded by the video decoder, and displaying the plurality of encoded video frames after being decoded by the video decoder.

14. The communication receiver of claim 8, wherein the decoding circuit is configured to flush the decoder picture buffer in response to the plurality of encoded video frames, after being decoded by the video decoder, being displayed in accordance with a display order.

15. A method for displaying a plurality of video frames, the method comprising:

determining, by a communication transmitter, one or more coding parameters for encoding the plurality of video frames;

encoding, by the communication transmitter, the plurality of video frames in accordance with one or more coding formats that utilize the one or more coding parameters to generate a plurality of encoded video frames;

verifying, by the communication transmitter without feedback from a communication receiver, whether the plurality of encoded video frames is to be displayed without jitter after being decoded with the one or more coding parameters;

iteratively adjusting, by the communication transmitter without feedback from the communication receiver, the one or more coding parameters until the plurality of encoded video frames are displayable, by a display device communicably connected to the communication receiver, without jitter after being decoded with the one or more coding parameters, is to be displayed by the display device without the jitter;

transmitting, by the communication transmitter via a network, the plurality of encoded video frames to the communication receiver;

recovering, by the communication receiver, the one or more coding parameters from the plurality of encoded video frames;

decoding, by the communication receiver, the plurality of encoded video frames in accordance with the one or more video coding formats with the recovered one or more coding parameters to provide a plurality of decoded video frames;

storing, by the communication receiver, the plurality of decoded video frames; and controlling, by the communication receiver, the display device to display the plurality of decoded video frames stored within the communication receiver.

16. The method of claim 15, wherein the one or more coding parameters comprise:

an initial display delay representing an initial delay in time before a display device commences to display the plurality of decoded video frames;

an extra decoder picture buffer size representing an extra size of a decoder picture buffer added to a conventional decoder picture buffer size to store the plurality of encoded video frames after being decoded with the one or more coding parameters;

a decode frame rate representing a rate of the video decoder in decoding the plurality of encoded video frames; or a display frame rate representing a rate of a display device in displaying the plurality of decoded video frames.

17. The method of claim 15, wherein the plurality of encoded video frames comprises:

a regular show frame which is to be decoded by the video decoder and to be displayed by the display device;

a hidden frame which is to be decoded by the video decoder and not to be displayed by the display device; and a show existing frame which is not to be decoded by the video decoder and is to be displayed by the display device.

18. The method of claim 15, wherein a rate at which the communication receiver decodes the plurality of encoded video frames is greater than a rate of the display device in displaying the plurality of decoded video frames stored in the communication receiver.

19. The method of claim 15, wherein the verifying comprises:
- modeling dynamics of the decoding, the storing, and the displaying to verify the plurality of encoded video frames, after being decoded with the one or more coding parameters, is to be displayed by the display device without the jitter.

20. The method of claim 15, wherein the verifying comprises detecting whether an underflow condition occurs in storing the plurality of decoded video frames.

* * * * *

UNITED STATES PATENT AND TRADEMARK OFFICE
CERTIFICATE OF CORRECTION

PATENT NO. : 10,904,540 B2
APPLICATION NO. : 16/173455
DATED : January 26, 2021
INVENTOR(S) : Zhijie Yang Page 1 of 1

It is certified that error appears in the above-identified patent and that said Letters Patent is hereby corrected as shown below:

In the Claims

Column 22, Line 5 (Claim 15): "more coding" should read --more video coding--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*